(12) United States Patent
Borde et al.

(10) Patent No.: US 10,046,614 B2
(45) Date of Patent: Aug. 14, 2018

(54) REINFORCING UNIT

(71) Applicant: SAF-HOLLAND GmbH, Bessenbach (DE)

(72) Inventors: Florian Borde, Biebergemünd (DE); Rolf Spielmann, Wertheim-Bettingen (DE); Roman Seitz, Niedernberg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 29 days.

(21) Appl. No.: 15/132,814

(22) Filed: Apr. 19, 2016

(65) Prior Publication Data

US 2016/0303936 A1    Oct. 20, 2016

(30) Foreign Application Priority Data

Apr. 20, 2015   (DE) .......................... 10 2015 105 966

(51) Int. Cl.
*B60G 9/00* (2006.01)
*B60B 35/08* (2006.01)
(Continued)

(52) U.S. Cl.
CPC .............. *B60G 9/003* (2013.01); *B60B 35/08* (2013.01); *B60G 7/001* (2013.01); *B60G 7/008* (2013.01);
(Continued)

(58) Field of Classification Search
CPC .......... B60G 9/003; B60G 9/006; B60G 9/04; B60G 9/02; B60G 9/00; B60G 7/008; B60G 7/00; B60G 7/001; B60G 2206/012; B60G 2206/8201; B60G 2206/30; B60G 2206/31; B60G 2206/10; B60G 2206/32; B60G 2206/014; B60G 2204/148; B60G 2204/4306; B60G 2204/43065; B60G 2200/31; B60G 2200/312; B60G 2200/314; B60G 2200/315; B60G 2200/20; B60G 2200/21; B60G 2200/22; B60G 2200/23; B60G 2200/24; B60B 35/166; B60B 35/08; B60B 35/04; B60B 35/02; B60B 35/16;
(Continued)

(56) References Cited

U.S. PATENT DOCUMENTS 1,479,193 A * 1/1924 McSpadden .......... F04B 53/144
138/96 R

FOREIGN PATENT DOCUMENTS

| DE | 10118696 | 10/2002 |
|----|----------|---------|
| DE | 102008061190 | 6/2010 |
| DE | 102013003301 | 8/2014 |

* cited by examiner

*Primary Examiner* — Keith J Frisby
(74) *Attorney, Agent, or Firm* — Price Heneveld LLP (57) ABSTRACT

Relates to a reinforcing unit and a running gear system with a reinforcing unit, comprising a first shell element and a second shell element, wherein the first shell element and the second shell element each comprise an engagement region on the tube side and an engagement region on the link side, wherein the first shell element and the second shell element each comprise a flange portion, wherein between the flange portion of the first shell element and the flange portion of the second shell element a tensile force can be established, which presses the first and the second shell element against an axle tube in such a manner that the reinforcing unit can be non-positively fixed on the axle tube, wherein the engagement region on the link side can be brought into engagement with a link unit.

26 Claims, 4 Drawing Sheets

(51) Int. Cl.
  *B60G 7/00* (2006.01)
  *B60B 35/04* (2006.01)
(52) U.S. Cl.
  CPC .......... *B60B 35/04* (2013.01); *B60G 2200/31* (2013.01); *B60G 2204/148* (2013.01); *B60G 2204/4306* (2013.01); *B60G 2206/012* (2013.01); *B60G 2206/8207* (2013.01)
(58) Field of Classification Search
  CPC .. B60B 35/00; Y10T 403/69; Y10T 403/4688
  USPC ...... 280/124.116, 124.128, 124.11, 124.153, 280/80.1; 301/124.1
  See application file for complete search history.

REINFORCING UNIT

BACKGROUND OF THE INVENTION

The present invention relates to a reinforcing unit for use in the running gear system of a utility vehicle and a running gear system having such a reinforcing unit.

From the prior art, running gear systems for utility vehicles are already known, in the case of which an axle tube is connected to a trailing arm of the utility vehicle, wherein the connection between the link element and the axle tube is designed to transmit forces, bending moments and torsional moments. Here it has proved itself for fixing the link element to the axle tube to form a welded connection between regions of the link element and of the axle tube. In addition to this it has proved itself to arrange intermediate elements between the link element and the axle tube and initially weld the intermediate element to the axle tube and subsequently fix the link element to the intermediate element. Through the local impairments of the condition of the structure of the material of the axle tube and of the link element in its area of application, the lifespan of this connection of the axle tube with the link element is subject to widely scattered influence.

The object of the present invention is to provide a reinforcement for the connection between a link unit and an axle tube, which can be easily mounted and easily retrofitted even in the case of existing utility vehicles. The object of the present invention, furthermore, is to provide a running gear system which eliminates the disadvantages from the prior art.

SUMMARY OF THE INVENTION

According to the invention, the reinforcing unit comprises a first shell element and a second shell element, wherein the first shell element and the second shell element each comprise an engagement region on the tube side and an engagement region on the link side, wherein the first shell element and the second shell element each comprise a flange portion, wherein between the flange portion of the first shell element and the flange portion of the second shell element a tensile force or preload force can be applied, which presses the first and the second shell element against an axle tube in such a manner that the reinforcing unit can be non-positively fixed on the axle tube, wherein the engagement region on the link side can be brought into engagement with a link unit. The first shell element and the second shell element are preferentially designed and arranged relative to one another in such a manner that they substantially wrap the axle tube. Here, the shell elements each comprise a flange portion which is designed in order to establish a tensile force or preload force in this flange portion, which presses the shell elements against the axle tube. Each of the shell elements comprises an engagement region on the tube side which preferentially has geometry that corresponds to the outer geometry of the axle tube. In this way, following the establishment of the non-positive connection between the first shell element and the second shell element, which presses the shell elements against the axle tube, preferentially a frictional connection over as large as possible an area between the respective engagement region on the tube side and the axle tube can be established. Adjacent to the engagement region on the tube side, each shell element comprises an engagement region on the link side, wherein the engagement region on the link side can be brought into engagement with a link unit preferentially in a non-positive manner. Through the non-positive engagement both with the link unit and also with the axle tube, the reinforcing unit thus reinforces the connection between the link unit and the axle tube. Since the reinforcing unit is fixed on the axle tube and on the link unit preferentially only non-positively or frictionally, it can be subsequently easily joined to an already existing assembly consisting of an axle tube and a link unit or demounted again in order to be able to inspect the regions located below the reinforcing unit. Here it is to be understood that both the engagement region on the tube side and also the engagement region on the link side in their dimensions are each adapted to the opposite geometry of the link unit or of the axle tube and preferentially have substantially the identical geometry. By using a reinforcing unit, the interface between the axle tube and the link unit can thus be reinforced in such a manner that welded connections which continue to be provided between the link unit and the axle tube are preferably relieved of load. In this way, the lifespan of the interface between an axle tube and a link unit can be significantly increased with the help of the reinforcing unit.

Preferentially, the first shell element and the second shell element in the respective engagement region on the tube side are preloaded against the axle tube, wherein the reinforcing unit is secured against displacement relative to the axle tube along an axial direction. Through the preload of the two shell elements against the axle tube, a frictional connection in particular can be preferably established between the respective engagement regions on the tube side and the axle tube. This frictional connection secures the reinforcing unit preferentially at least against displacement relative to the axle tube along an axial direction. The axial direction in this case is preferentially the longitudinal extent direction or the main extent direction of the axle tube. In the case of an axle tube that is designed in a hollow cylindrical shape, the axial direction is preferentially the cylinder axis. By securing the reinforcing unit against displacement relative to the axle tube along the axial direction it is to be ensured in particular that the engagement region on the link side of the respective shell element of the reinforcing unit is always kept in engagement with a corresponding opposite engagement geometry of the link unit. In addition, for securing the reinforcing unit against displacement relative to the axle tube, an engagement region between the link unit and the reinforcing unit can preferentially also be provided which secures the first and/or the second shell element against displacement relative to the link unit along the axial direction.

Particularly preferably, the engagement region on the link side can be brought into non-positive engagement with a collar of the link unit, wherein preferentially the engagement region on the link side presses the collar against the axle tube. In particular preferably, the link unit thus comprises a collar which in other words is a projection that preferentially runs about the axle tube, into which the engagement region on the link side preferentially non-positively engages. Here, the collar can preferentially additionally have a geometry which permits an undercut with the engagement region on the link side. The main force direction with which the engagement region on the link side of the respective shell element acts on the collar in this case preferentially runs substantially along the radial direction longitudinally running about the axial direction or perpendicularly to the same. In this way, the engagement region on the link side presses the collar against the axle tube in order to preferentially support a welded connection between the link unit and the axle tube in this manner.

Particularly preferably, the engagement of the engagement region on the link side on the collar and the engagement region on the tube side on the axle tube supports the link unit relative to the axle tube in order to relieve load on a welded connection established between the link unit and the axle tube. In other words, the reinforcing unit thus transmits in each case a force between the engagement region on the link side and the tube side which acts between the link unit and the axle tube. In this way, the reinforcing unit absorbs a part of the forces and moments which act between the link unit and the axle tube. These forces and moments result in particular from weight forces of the utility vehicle, from bending moments due to lever arms on the link unit, the wheel suspension and further connecting points in the running gear system of the utility vehicle, and from torsional moments, which in particular during braking operations act on the axle tube and the link unit. Thanks to the reinforcing unit, in particular the connection of the entire running gear system can be significantly increased, since the welded connection between the axle tube and the link unit which is more sensitive to crack formation and brittle or creep fractures resulting from this is relieved of load by the reinforcing unit.

In particular preferably, the connection of the flange portions is detachable, wherein preferably a plurality of bolts or fastening means is provided in order to establish a tensile force or preload force between two flange portions located opposite one another. The great advantage of the present invention is that the reinforcing unit is easily mountable to a running gear system and also demountable from the same again. In this way, the reinforcing unit, for maintenance purposes and for inspecting the connection zone between the link unit and the axle tube, can be demounted from the running gear system and subsequently assembled back on the running gear system using only few operational steps. In order to ensure this, the connection of the flange portions of the first and of the second shell elements is a detachable connection. Here, in particular preferably bolts are suitable which are equipped with a thread, via which a tensile force or preload force between two opposite flange portions is established. Furthermore, the use of bolts for establishing a tensile force or preload force between two opposite flange portions also allows adapting the reinforcing unit in a very simple manner to manufacturing tolerances that are present in the running gear region, in particular in the region of the axle tube and of the link unit. Preferentially, by establishing a certain tightening torque also for different geometries or deviations due to manufacturing tolerances from a standard geometry, the same tightening forces of the reinforcing unit, in particular its shell elements, to the axle tube and the link unit can be ensured.

In a particularly preferred embodiment, the shell elements in the region of the flange portions have a greater stiffness than in the remaining regions which are in engagement with the axle tube and/or the link unit. In particular, caused by the locally thickened material, in the region of the flange portions, the shell elements are stiffer in the region of the flange portions, in particular torsionally stiffer than the shell elements in the region outside the flange portions. This effect can be utilized in particular in order to concentrate the holding forces that are transmitted from the reinforcing unit to the axle tube and the link unit in certain regions, i.e. preferentially in the region of the flange portions and in particular in these regions achieve a high contact pressure and lateral stabilization. By fixing the shell elements with a certain orientation based on the fastening geometry between the link unit and the axle tube to the link unit and the axle tube, regions of the weld seam in particular which are established between the link unit and the axle tube, can be more intensively supported than the remaining regions between the axle tube and the link unit. In other words, a locally increased stabilization of the connection between link unit and axle tube can be achieved by the reinforcing unit through the higher stiffness of the flange portions.

Preferentially, the engagement region on the tube side has a greater extent along the axial direction than the engagement region on the link side. This greater extent of the engagement region on the tube side along the axial direction serves in particular for securing the reinforcing unit mainly on the axle tube against displacement along or parallel to the axial direction. In this way, the engagement region on the link side can be optimized in particular in order to merely exert a pressure force on the link unit which substantially acts transversely or preferentially perpendicularly to the axial direction, while its fixing based on the axial direction is predominantly assumed by the engagement region on the tube side.

In particular preferably, the extent of the engagement region on the tube side along the axial direction is a multiple, preferentially three to five times the extent of the engagement region on the link side along the axial direction. As reference direction along the axial direction a direction parallel to the axial direction is preferentially defined, wherein this direction on the one hand is defined by the extent of the axle tube, but is a feature of the reinforcing unit also by way of the configuration of the geometry of the engagement region on the tube side to fit the axle tube. Within the scope of tests regarding the present invention it has been shown that the design of the reinforcing unit such that the engagement regions on the tube side of the shell elements have a substantially larger engagement area with the axle tube than the engagement region on the link side has an engagement area with the link unit, ensures particularly great stability of the fixing of the reinforcing unit on the combination of axle tube and link unit. At the same time, the engagement region between reinforcing unit and link unit in this case is preferably subjected only minimally to forces that act along the axial direction. Here it has been shown that the best reinforcing effect is achievable when the ratio of the extent of the engagement region on the tube side along the axial direction to the extent of the engagement region on the link side along the axial direction is greater than 2 and particularly preferably lies between 3 and 5. In this way, a particularly advantageous distribution of the respective forces over the engagement regions on the tube side and the engagement regions on the link side is possible. Here, the engagement region on the tube side assumes the major part of the force for fixing the reinforcing unit and acting along the axial direction while the engagement region on the link side preferentially exerts the pressure force on the link unit that mainly acts transversely to the axial direction.

Alternatively preferably, the extent of the engagement region on the tube side along the axial direction is 2 to 3.5 times or 4 to 6 times the extent of the engagement region on the link side. The ratio range of 2 to 3.5 has proved in tests of the applicant to be particularly suitable for axles of utility vehicle trailers. In this ratio range, it was possible to achieve the lowest weight with fixed connection that is adequate for utility vehicle trailers between the shell elements and the axle tube. The ratio range of 4 to 6 has proved advantageous for tractor units since in this case higher strength values of the connection between the shell elements and the axle tube, in particular on the rear axle or rear axles, ensure an increased operational safety.

Advantageously, the engagement region on the link side transversely to the axial direction has a mean radial extent which is greater than the mean radial extent of the engagement region on the tube side transversely to the axial direction. Here, the mean value of the radial distance based on the axial direction is defined as mean radial extent. Thus, if the engagement region on the link side or the tube side has a cylindrical extent, the mean radial extent is preferentially the radius of the cylindrical geometry of the respective engagement region. In the case that the axle tube and thus also the corresponding engagement region on the tube side has a rectangular shape, the mean radial extent is preferentially the radius of a circle which has the mean value of the respective rectangular geometry and its distance from the axial direction. The advantage of a mean radial extent of the engagement region on the tube side that is smaller than the mean radial extent of the engagement region on the link side is that the reinforcing unit can be pushed in the direction of the link unit onto the axle tube and the corresponding engagement region on the link unit.

Preferably, the collar has a mean radial extent transversely to the axial direction that is greater than the mean radial extent of the engagement region on the link side in a stress-free state of the reinforcing unit. In other words, the collar preferentially has an oversize relative to the engagement region on the link side of the respective shell element, while the shell element is in a stress-free state. The state in which the shell elements are not yet mounted to the axle tube or the link unit and have not yet been elastically deformed through the tensile force or preload force in the flange regions in order to act with a press fit on the axle tube and the collar of the link unit is particularly defined in the present case as stress-free state. As a result of the oversize of the collar relative to the engagement region on the link side it is possible to achieve a uniform contact pressure of the engagement region on the link side on the collar owing to the elastic deformation of the engagement region on the link side that takes place during assembly. In this way, in particular the non-positive connection between the engagement region on the link side and the collar of the link unit is reinforced and in addition to the tensile stress generated directly in the flange portions a more even tensile stress along the circumferential direction of the engagement regions on the link side between the respective flange portions can be achieved.

In a particularly preferred embodiment, the engagement region on the tube side and/or the engagement region on the link side are semi-cylindrical in shape. Here it is to be understood that the present semi-cylindrical design of the engagement regions on the tube side and/or the link side are provided corresponding to an outer geometry of the axle tube and/or of the collar of the link unit. In particular preferably, the portion on the tube side of a shell element can be designed semi-cylindrically in order to be adapted to a cylindrical tube axle, while the engagement region on the link side is equipped with a geometry deviating from the semi-cylindrical shape in order to be adapted to an outer geometry of the collar of the link unit that is designed for example rectangularly or square. By way of an outer geometry of the axle tube and/or of the collar of the link unit that deviates from the cylindrical shape, in particular torsional moments can also be preferably transmitted via a positive connection between the corresponding engagement region on the tube side and/or link side, while a cylindrical shape merely allows a non-positive transmission of these moments. The advantage of the cylindrical design of the axle tube and/or of the collar of the link unit is that the circumferential position of the reinforcing unit relative to the axle tube and to the link unit is freely selectable and thus in particular the flange portions can be adapted particularly accurately to welding geometries or weld seams provided between the link unit and the axle tube.

In a further preferred embodiment, the engagement region on the link side has a local irregularity, wherein in the region of the local irregularity the pressure force exerted by the engagement region on the link side on the link unit preferentially differs from the mean value of the pressure force over the entire contact area between the engagement region on the link side and the link unit. Local irregularities, such as for example flattened or projecting portions, on the engagement region on the link side serve in particular for locally increasing the pressure force of the engagement region on the link side on the link unit, in particular preferably on the collar of the link unit. Within the scope of tests it has been shown that such local stress increases or also local stress reductions through corresponding local recesses on the engagement regions allows the adaptation characteristic of the reinforcing unit to the link unit to be particularly favourably adapted to the weld seam geometry that is provided between the link unit and the axle tube and the reinforcing effect of the reinforcing unit can thus be significantly improved. By targeted provision of local irregularities such as protrusions or local recesses along the circumference of the engagement regions on the link side, a certain distribution of the pressure forces of the engagement regions on the link side on the link unit can be established.

According to the invention, a running gear system is provided which comprises an axle tube and a link unit, wherein the axle tube is fixed on the link unit, wherein on two sides of the link unit in each case a reinforcing unit, as described before, is fixed or can be fixed to the connecting region between the axle tube and the link unit. Particularly preferably, the running gear system thus comprises two reinforcing units, of which one each can be fixed both on the axle tube and also on the link unit to a side each of the link unit adjoining a connecting portion, in which preferentially a weld seam is established between the axle tube and the link unit, and thus reinforces the connection between axle tube and link unit.

In a preferred embodiment, the engagement region on the link side is brought or can be brought into non-positive engagement with a collar of the link unit, wherein the collar is provided on an intermediate element, wherein the intermediate element is arranged between the axle tube and a trailing arm of the link unit. The intermediate element is preferentially an annular body known from the prior art, also known as "axle wrap" and wraps the axle tube at least in regions and can be fixed particularly preferably to the axle tube via so-called welding windows. A clearance on the intermediate element along which a weld seam between the intermediate element and the axle tube can be established is preferentially defined as welding window in this connection. The intermediate element is preferentially in turn fixed to the trailing arm of the link unit via a welded connection.

Particularly preferably, the intermediate element projects over the trailing arm along the axial direction in such a manner that the intermediate element forms a collar on which the reinforcing unit and in particular preferably the engagement region of the reinforcing unit on the link side can act. Particularly preferably, the reinforcing unit in this case is designed in such a manner that it can also act on already existing and already assembled or welded-together connections of link unit and axle tube with an intermediate element, which projects under the trailing arm of the link unit in such a manner that a collar is formed, in order to be employed for the subsequent reinforcement of these already existing running gear systems.

Further preferably, at least one reinforcing unit is arranged on the combination of axle tube and link unit in such a manner that the flange portions are arranged adjacent to a connecting portion of the intermediate element with the axle tube. Particularly preferred is that the flange portions, which preferentially have a greater stiffness than the rest of the shell elements of the reinforcing unit, are arranged based on the circumference at the same height or adjacent to a connecting portion of the intermediate element. The connecting portion of the intermediate element in this case is preferentially a welding window in which the intermediate element is welded to the axle tube. Adjacent to the connecting portion in the present context preferentially defines that the flange portions should be a preferably short distance from the connecting portion of the intermediate element or based on the axial direction should be arranged at the same height with the connecting portion of the intermediate element.

It is to be understood that further features and advantages of the reinforcing unit according to the invention can likewise be utilized in the running gear system according to the invention.

BRIEF DESCRIPTION OF THE DRAWINGS

Further advantages and features of the present invention are obtained from the following description with reference to the attached figures. It shows.

DETAILED DESCRIPTION OF THE PREFERRED EMBODIMENTS

Figure 1:
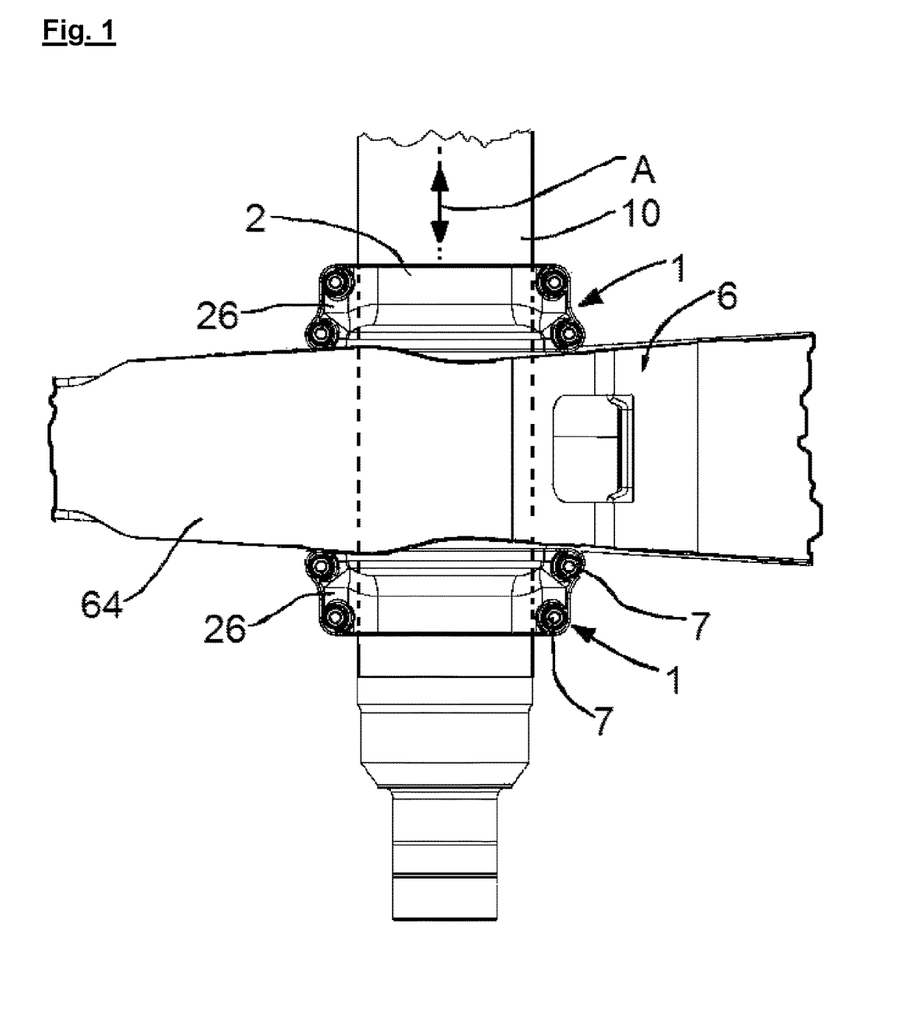
FIG. 1 a top view of a preferred embodiment of the running gear system according to the invention, FIG. 2 a sectioned view of a part of the running gear system shown in FIG. 1, FIG. 3 a perspective view of a preferred embodiment of a part of the running gear system according to the invention, and FIG. 4 a sectioned view of the arrangement of a preferred embodiment of the reinforcing unit according to the invention on a combination of axle tube and link unit.

In the view of a preferred embodiment of the running gear system according to the invention shown in FIG. 1, an axle tube 10 is shown, which substantially extends along an axial direction A and forms a connection region (shown in dashed line) with a link unit 6. To reinforce the connection between axle tube 10 and link unit 6, reinforcing units 1 each are attached on both sides of the link unit 6. Here, of both the reinforcing units 1, only the first shell element 2 with its flange portions 26 formed thereon is shown in each case. In the region of the flange portions 26, the first shell element 2 is connected to a lower, second shell element 4 via bolts 7 (hidden in FIG. 1). By way of the bolts 7, a tensile force or preload force can be established between the upper, first shell element 2 and the second shell element 4, which ensures that the upper shell element 2 and the lower shell element 4 are pressed against the axle tube 10 and also against a portion of the link unit 6. Of the link unit 6, merely the link arm 64 is shown in this figure, wherein the further portions of the link unit 6, such as a preferentially existing intermediate element 63, and a collar 62 (not shown) which is in engagement with an engagement region 24 (not shown) on the link side of the first shell element 2, are each hidden by the first shell elements 2. Alternatively to the representation shown in FIG. 1, the axle tube 10 can also be designed in two parts, wherein the stub axle shown in the lower half of the figure can be arranged offset transversely to the axial direction A based on the upper part of the axle tube 10. With these embodiments, a reinforcement of the connection of the individual portions of the axle tube 10 to the link unit 6 using reinforcing units 1 is also opportune.

Figure 2:
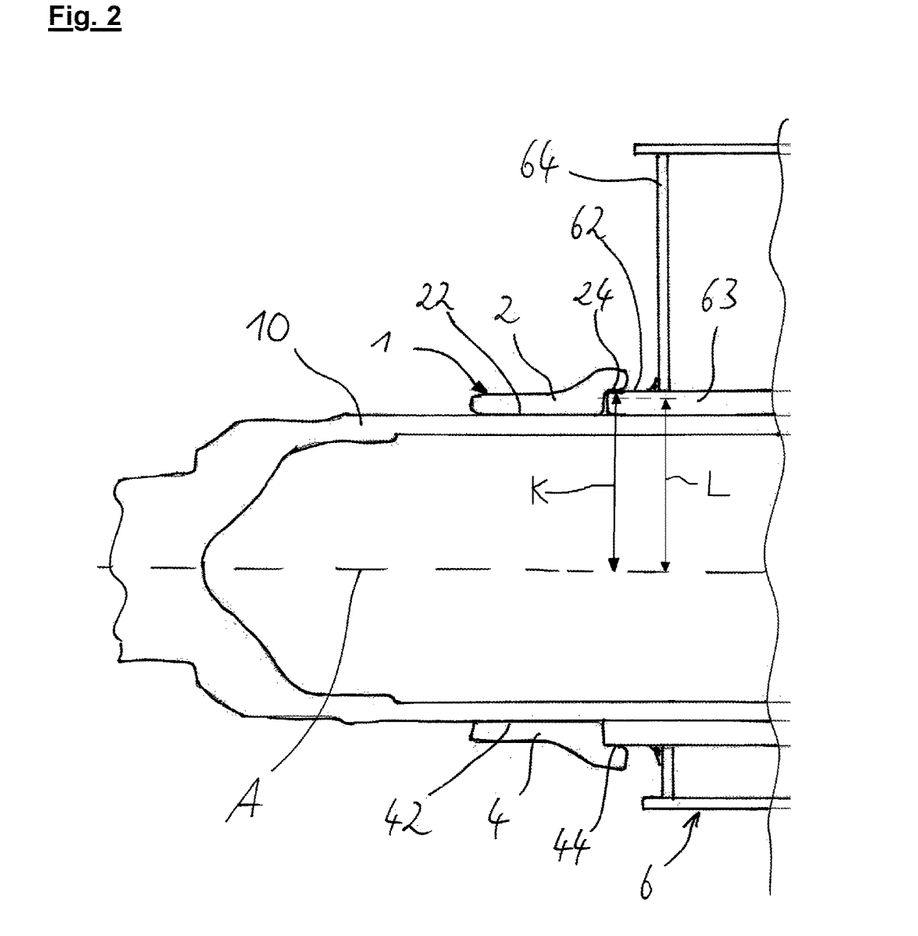

FIG. 2 shows a sectioned view of a preferred embodiment of the running gear system according to the invention, wherein a part of the axle tube 10 and the left of preferably two reinforcing units 1 that are arranged on the link unit 6 is shown. The first shell element 2 preferentially comprises an engagement region 24 on the link side and an engagement region 22 on the tube side. Analogously to this, the second shell element 4 comprises an engagement region 44 on the link side and an engagement region 42 on the tube side. The engagement regions 24, 44 on the link side are designed in such a manner that they can be brought into non-positive engagement with a collar 62 of the link unit 6 in such a manner that the non-positive connection exists preferentially along the entire area of the engagement portions 24, 44 on the link side. Here, non-positive engagement is to mean in particular preferably also a frictional connection established relative to the collar 62 under preload of the engagement regions 24, 44 on the link side. In a first preferred embodiment, the collar 24 in this case can be designed in one piece with the remaining portions of the link unit 6, such as for example the only schematically shown trailing arm 64. With the embodiment shown in FIG. 2, an intermediate element 63 is preferentially provided which is preferentially welded onto the intermediate element 63 via a weld seam in the region of the perpendicular joint of the link arm 64. Furthermore, the intermediate element 63 preferentially comprises a connecting portion 66 which is not shown, and which is preferably designed as welding window and serves for the materially joined fixing of the intermediate element 63 on the axle tube 10. The mean radial extent K of the stop is preferentially greater than the mean radial extent L of the engagement region 24, 44 on the link side in a state in which the respective shell element 2, 4 is not preloaded. Here, only the preloaded state is shown in FIG. 2, in the case of which the shell elements 2, 4 are preloaded against the stop in such a manner while the radial extent L of the engagement region 24, 44 on the link side is only shown in dashed lines.

Figure 3:
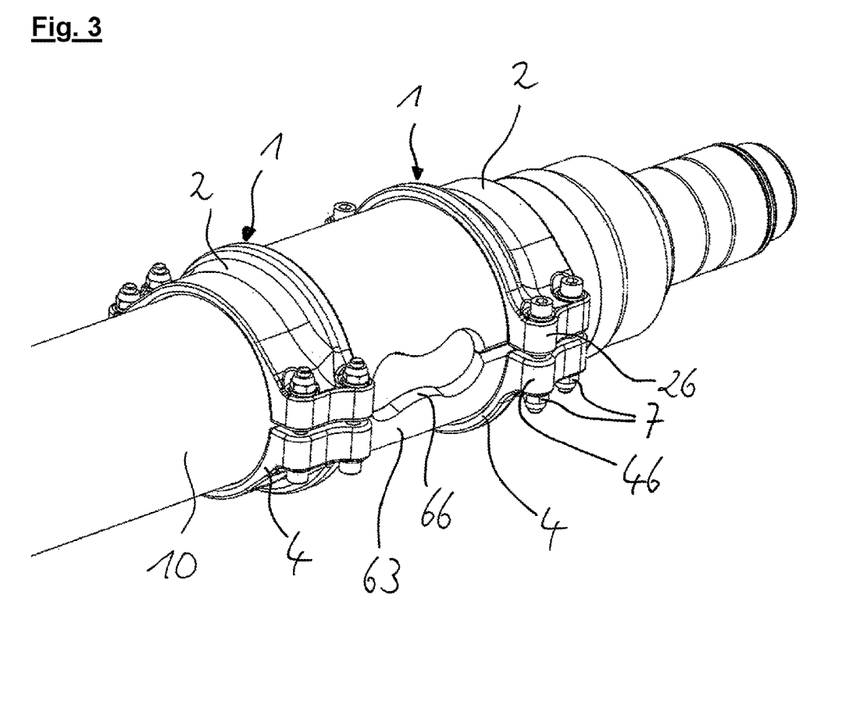

FIG. 3 shows a perspective view of a preferred embodiment of the running gear system according to the invention, wherein of the link unit 6 only the intermediate element 63 is shown, while the remaining parts of the link unit 6 for the sake of clarity are not shown. The intermediate element 63 encloses the axle tube 10 preferentially via its approximately entire circumference and is welded to the axle tube 10 in the region of the connecting portion 66. To reinforce the connection between the intermediate element 63 and the axle tube 10 and for relieving load on the weld seams provided thereon, reinforcing units 1 are provided preferentially on both sides of the intermediate element. The reinforcing units preferentially engage with their respective engagement region 22, 44 (not shown) on the link side in the collar 62 which is likewise not shown, which is preferentially formed on the intermediate element 63. Furthermore, the reinforcing units 1 comprise engagement regions 22, 42 (not shown) on the tube side, which are non-positively fixed to the axle tube 10. For establishing the non-positive connection and for preloading the respective first shell element 2 and second shell element 4 of the respective reinforcing unit 1 relative to the axle tube 10 and the collar 62, bolts 7 are provided, via which a tensile stress can be established. Particularly preferably, the tensile stress in this case is established by a torque wrench in a magnitude calculated beforehand. In this manner it can be ensured that within the reinforcing units 1, no distortion through different tensile force or preload force is caused in different bolts 7. In the case of the embodiment shown in FIG. 3 it is additionally clearly evident that the flange portions 26, 46 of the reinforcing units 1 are each arranged at the height of the connecting portion 66 of the intermediate element 63. In other words, the reinforcing units 1 are each arranged in such a manner that the flange portions 26, 46 preferentially have the least possible distance from the connecting portion 66. In this way, the increased stiffness of the first shell element 2 and of the second shell element 4 in the region of the respective flange portions 26, 46 can be particularly preferably utilized in order to particularly stiffen the combination of intermediate element 63 and axle tube 10 in particular in the region of the connecting portion 26 and thus prevent incipient cracking of the weld seams in the connecting portion 66 to the greatest possible degree. It has been shown that in this manner and with this arrangement of the reinforcing units 1 on the combination of intermediate element 63 and axle tube 10, the lifespan of the entire connection between the link unit 6 and the axle tube 10 can be significantly increased.

Figure 4:
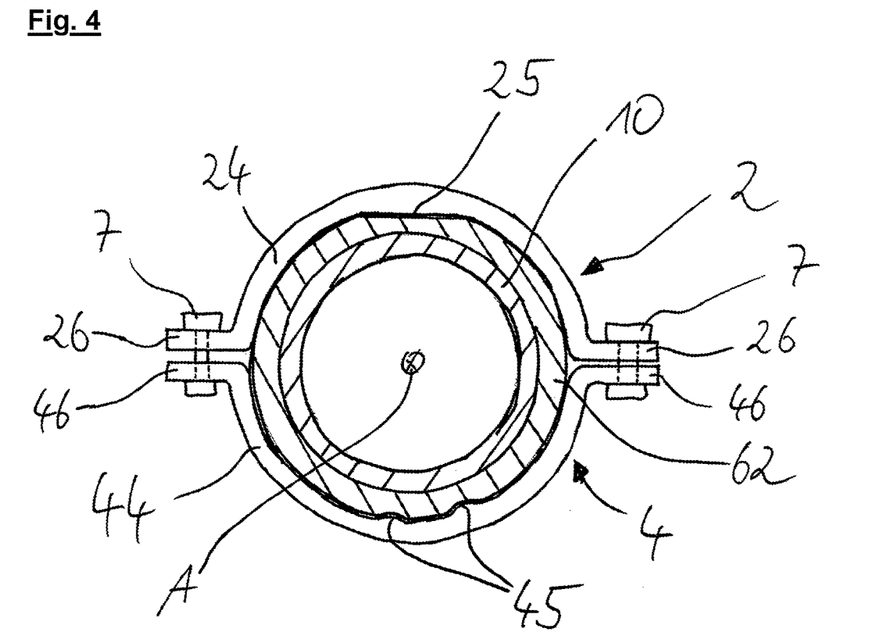

FIG. 4 shows a sectional view of the combination of the axle tube 10 with a collar 62 of a link unit 6 and a reinforcing unit 1 arranged thereon. Exemplarily, a first preferred embodiment of a local irregularity 25 is shown here on the first shell element 2 of the reinforcing unit 1. The local irregularity 25 in this case can be preferentially formed as a geometry that deviates from the circular or cylindrical shape, which in the present example is substantially designed flat, for example. Alternative embodiments of the local irregularity 25, 45 are shown on the second shell element 4. There, two local irregularities 45 embodied as lug-shaped projections are exemplarily shown, each of which reach a punctiform local elevation of the pressure of the engagement region 44 on the link side exerted on the collar 62. By targeted distribution of such local irregularities 25, 45 along the circumference of the shell elements 2, 4, particularly preferred stress or contact pressure characteristics can be achieved which in a preferred manner can specifically avoid stress peaks in the welded connections between the link unit 6 and the axle element 10. It is to be understood that the local irregularities 25, 45 can be preferentially designed also as local recesses analogously to the projections shown in FIG. 4 in order to achieve local reductions of the contact pressure on the collar 62 through the engagement regions 24, 44 of the shell elements 2, 4 on the link side.

REFERENCE CHARACTERS

1—Reinforcing unit
2—First shell element
4—Second shell element
6—Link unit
7—Bolt
10—Axle tube
22—Engagement region tube side
24—Engagement region link side
25—Local irregularity
26—Flange portion
42—Engagement region tube side
44—Engagement region link side
45—Local irregularity
46—Flange portion
62—Collar
63—Intermediate element (axle wrap)
64—Trailing arm
66—Connecting portion
A—Axial direction
K—Mean radial extent
L—Mean radial extent The listing of claims is as follows:

1. A reinforcing unit, comprising:
   a first shell element; and
   a second shell element;
       wherein the first shell element and the second shell element each comprise an engagement region on a tube side and an engagement region on a link side;
       wherein the first shell element and the second shell element each comprise a flange portion;
       wherein between the flange portion of the first shell element and the flange portion of the second shell element a tensile force is applied that presses the first and the second shell elements against an axle tube such that the reinforcing unit is non-positively fixed on the axle tube; and
       wherein the engagement region on the link side is brought into engagement with a link unit.

2. The reinforcing unit according to claim 1, wherein the first shell element and the second shell element in the respective engagement region on the tube side are configured to be preloaded against the axle tube, and wherein the reinforcing unit is configured to be secured against displacement relative to the axle tube along an axial direction.

3. The reinforcing unit according to claim 2, wherein the link unit comprises a collar, wherein the engagement region on the link side is configured to be brought into non-positive engagement with the collar, and wherein the engagement region on the link side is configured to press the collar against the axle tube.

4. The reinforcing unit according to claim 3, wherein a connection between the flange portions is detachable, and wherein a plurality of bolts are configured to exert a tensile force between two flange portions located opposite one another.

5. The reinforcing unit according to claim 4, wherein the shell elements in the region of the flange portions have a greater stiffness than in the remaining regions and are configured to engage at least one of the axle tube and the link unit.

6. The reinforcing unit according to claim 5, wherein the engagement region on the tube side has a greater extent along the axial direction than the engagement region on the link side.

7. The reinforcing unit according to claim 6, wherein the extent of the engagement region on the tube side along the axial direction is a multiple of at least three times the extent of the engagement region on the link side.

8. The reinforcing unit according to claim 6, wherein the extent of the engagement region on the tube side along the axial direction is 2 to 3.5 times the extent of the engagement region on the link side.

9. The reinforcing unit according to claim 6, wherein the extent of the engagement region on the tube side along the axial direction is 4 to 6 times the extent of the engagement region on the link side.

10. The reinforcing unit according to claim 6, wherein the engagement region on the link side transversely to the axial direction has a mean radial extent which is greater than the mean radial extent of the engagement region on the tube side transversely to the axial direction.

11. The reinforcing unit according to claim 3, wherein the collar has a mean radial extent transversely to the axial direction that is greater than the mean radial extent of the engagement region on the link side in a stress-free state of the reinforcing unit.

12. The reinforcing unit according to claim 11, wherein the engagement region on at least one of the tube side and the engagement region on the link side comprises a semi-cylindrical-shape.

13. The reinforcing unit according to claim 12, wherein the engagement region on the link side has a local irregularity, and wherein in the region of the local irregularity a pressure force exerted by the engagement region on the link side on the link unit differs from the mean value of a pressure force over the contact area between the engagement region on the link side and the link unit.

14. The reinforcing unit according to claim 2, wherein the engagement region on the tube side has a greater extent along the axial direction than the engagement region on the link side.

15. The reinforcing unit according to claim 2, wherein the extent of the engagement region on the tube side along the axial direction is a multiple of at least three times the extent of the engagement region on the link side.

16. The reinforcing unit according to claim 2, wherein the extent of the engagement region on the tube side along the axial direction is 2 to 3.5 times the extent of the engagement region on the link side.

17. The reinforcing unit according to claim 2, wherein the extent of the engagement region on the tube side along the axial direction is 4 to 6 times the extent of the engagement region on the link side.

18. The reinforcing unit according to claim 1, wherein the engagement region on the link side is configured to be brought into non-positive engagement with a collar of the link unit, and wherein the engagement region on the link side is configured to press the collar against the axle tube.

19. The reinforcing unit according to claim 1, wherein the connection of the flange portions is detachable, and wherein a plurality of bolts are configured to exert a tensile force between two flange portions located opposite one another.

20. The reinforcing unit according to claim 1, wherein the shell elements in the region of the flange portions have a greater stiffness than in the remaining regions and are configured to engage at least one of the axle tube and the link unit.

21. The reinforcing unit according to claim 1, wherein the engagement region on the link side transversely to the axial direction has a mean radial extent which is greater than the mean radial extent of the engagement region on the tube side transversely to the axial direction.

22. The reinforcing unit according to claim 1, wherein the engagement region on at least one of the tube side and the engagement region on the link side comprises a semi-cylindrical shape.

23. The reinforcing unit according to claim 1, wherein the engagement region on the link side has a local irregularity, and wherein in the region of the local irregularity a pressure force exerted by the engagement region on the link side on the link unit differs from the mean value of a pressure force over the contact area between the engagement region on the link side and the link unit.

24. A running gear system, comprising:
the axle tube; and
the link unit;
wherein the axle tube is fixed on the link unit;
wherein on two sides of the link unit a reinforcing unit according to claim 1 is configured to be fixed to the connecting region between the axle tube and the link unit.

25. The running gear system according to claim 24, wherein the engagement region on the link side can be brought into non-positive engagement with a collar of the link unit, wherein the collar is provided on an intermediate element, and wherein the intermediate element is arranged between the axle tube and a trailing arm of the link unit.

26. The running gear system according to claim 25, wherein at least one reinforcing unit is arranged on a combination of axle tube and link unit such that the flange portions are arranged adjacent to a connecting portion of the intermediate element with the axle tube.

* * * * *